(12) United States Patent
Pohl et al.

(10) Patent No.: US 7,051,975 B2
(45) Date of Patent: May 30, 2006

(54) AIRCRAFT FLAP OR SLAT DRIVE SYSTEM WITH REDUNDANT DRIVES AND SHAFT DRIVE LINES

(75) Inventors: Ulrich Pohl, Bremen (DE); Carsten Thomas, Bremen (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 10/868,175

(22) Filed: Jun. 14, 2004

(65) Prior Publication Data

US 2005/0029407 A1    Feb. 10, 2005

(30) Foreign Application Priority Data

Jun. 13, 2003    (DE) ................... 103 26 799

(51) Int. Cl.
*B64C 13/34*    (2006.01)

(52) U.S. Cl. .................... 244/75; 244/213

(58) Field of Classification Search ............. 244/213, 244/214, 215, 216, 217, 218, 219, 75 R
See application file for complete search history.

(56) References Cited

U.S. PATENT DOCUMENTS

| | | | | |
|---|---|---|---|---|
| 2,295,306 A | * | 9/1942 | Tampier | ............. 244/75 R |
| 3,986,689 A | | 10/1976 | Maltby | |
| 4,256,277 A | | 3/1981 | Embree | |
| 4,260,121 A | * | 4/1981 | Baston et al. | ............ 244/213 |
| 4,575,027 A | | 3/1986 | Cronin | |
| 4,688,744 A | * | 8/1987 | Aldrich | ............ 244/75 R |
| 4,715,567 A | | 12/1987 | Poccard | |
| 4,765,568 A | | 8/1988 | Carl et al. | |
| 4,779,822 A | * | 10/1988 | Burandt et al. | ........ 244/75 R |
| 4,892,274 A | | 1/1990 | Pohl et al. | |
| 5,743,490 A | * | 4/1998 | Gillingham et al. | ...... 244/75 R |
| 6,200,223 B1 | | 3/2001 | Martens | |
| 6,755,375 B1 | | 6/2004 | Trikha | |
| 2004/0200928 A1 | | 10/2004 | Degenholtz et al. | |
| 2005/0151027 A1 | | 7/2005 | Recksiek et al. | |
| 2005/0151028 A1 | | 7/2005 | Pohl et al. | |

* cited by examiner

*Primary Examiner*—Tien Dinh
(74) *Attorney, Agent, or Firm*—W. F. Fasse; W. G. Fasse

(57) ABSTRACT

An aircraft flap (or slat) drive apparatus includes first and second centralized drive units that respectively rotationally drive first and second drive lines in both wings. The first drive line includes shaft segments connected end-to-end by selectively engageable separating devices. The outboard ends of the first and second drive lines are coupled through one of the separating devices, in each wing. At least one actuator mechanism connects each flap to a respective shaft segment of the first drive line, and converts the drive line rotational motion to a flap translational motion. If a component breaks, jams, or otherwise fails, it is isolated by disengaging the two adjacent separating devices with the faulty component therebetween, so that the rest of the apparatus remains functional. Each one or both of the drive units can drive one or more or all of the flaps through the interconnected first and second drive lines.

9 Claims, 1 Drawing Sheet

AIRCRAFT FLAP OR SLAT DRIVE SYSTEM WITH REDUNDANT DRIVES AND SHAFT DRIVE LINES

CROSS-REFERENCE TO RELATED APPLICATIONS

This application is related to U.S. application Ser. No. 10/812,507 filed Mar. 29, 2004 and U.S. application Ser. No. 11/021,723 filed Dec. 22, 2004.

PRIORITY CLAIM

This application is based on and claims the priority under 35 U.S.C. §119 of German Patent Application 103 26 799.9, filed on Jun. 13, 2003, the entire disclosure of which is incorporated herein by reference.

FIELD OF THE INVENTION

The invention relates to an apparatus for actuating lift enhancing elements, e.g. trailing edge flaps and/or leading edge slats, on the lifting wings of an aircraft, using at least one centralized drive unit that drives at least one rotational shaft drive line, which in turn drives actuator mechanisms, that convert the rotational motion of the shaft drive line into a translational motion of the lift enhancing elements.

BACKGROUND INFORMATION

The lift enhancing elements, including trailing edge landing flaps and leading edge slats, provided on the lifting wings of aircraft are conventionally operated or actuated by arrangements including a central drive unit, a respective rotational shaft drive line extending to the left and to the right from the drive unit respectively along the left wing and the right wing, as well as a plurality of decentralized actuator mechanisms. The drive unit exerts a rotational motion and drive power onto the left and right drive lines. From the drive lines, the rotational motion and drive power are applied to the actuator mechanisms, which in turn convert the rotational motion into a translational motion that is applied to the respective connected lift enhancing element, i.e. landing flap or slat. Thereby, the drive unit achieves the desired extension, retraction, or deflection of the respective slats and flaps via the drive lines and the actuator mechanisms. In order to ensure a uniform synchronous actuation of all landing flaps and/or slats, all of the lift enhancing elements of a respective wing are typically mechanically connected to the same single common rotational shaft drive line. Thus, all of the lift enhancing elements connected to the single drive line will necessarily be actuated in unison.

FIG. 1 illustrates an example of an apparatus of the type generally discussed above, for operating or actuating the inboard landing flaps 1 and the outboard landing flaps 2 of the left and right wings of an aircraft (not shown). A central drive unit 7 is centrally located between the two wings, and rotationally drives two synchronized rotational shaft drive lines 5 and 6 that respectively extend into and along the two opposite wings from the central drive unit 7. Each landing flap 1 and 2 is respectively mechanically connected by two actuator mechanisms 3 and 4 to a respective one of the drive lines 5 or 6. The actuator mechanisms 3 and 4 convert the rotational shaft motion of the drive line 5 or 6 into a translational motion that is applied to the connected landing flap 1 or 2, in order to drive the landing flap as required.

It is a serious disadvantage with such a drive arrangement, that mechanical faults or failures of various types, e.g. a jamming of an actuator mechanism or of a lift enhancing element, or a break of a rotational shaft, can potentially lead to a local overloading of the arrangement or to undesirable and improper behavior of the apparatus, for example an asymmetrical actuation of the lift enhancing elements. For this reason, in the event such a fault or failure is recognized, generally the entire apparatus is stopped and arrested in its momentary existing position through the use of braking devices. The disadvantage of such a procedure is that a single mechanical fault or failure of even a single element in the entire apparatus can lead to the complete loss of the entire functionality of the landing flap and slat system.

The above discussed problems or disadvantages are to be overcome at least partially by arrangements that provide a multiplicity of certain individual components as well as a mechanical decoupling of various components of the apparatus. This is to enable a partial further operation of the apparatus even in the case of a localized mechanical failure. An example of such an apparatus is illustrated in FIG. 2, whereby the drive units and the rotational shaft drive lines have been duplicated. In other words, this arrangement includes a first drive unit 7 connected via first rotational shaft drive lines 5A and 6A to the inboard landing flaps 1 via the connected actuator mechanisms 3 and 4, as well as a second drive unit 8 that drives the outboard landing flaps 2 through second rotational shaft drive lines 9 and 10 via the connected actuator mechanisms 3 and 4. This provides two separate drive arrangements, namely one for the inboard flaps and one for the outboard flaps. In the event of a localized fault, such as a jamming or a failure of one drive unit or one actuator mechanism, or a break of a shaft drive line, a partial operability of the unaffected drive arrangement continues, but a substantial loss of the apparatus functionality cannot be avoided.

FIG. 3 schematically illustrates a further apparatus with an even higher degree of separation of sub-systems, comprising plural decentralized drives 11 that are entirely mechanically separate from one another, and that are each respectively individually connected to an associated rotational shaft drive line 12 for respectively driving a single inboard or outboard landing flap 1 or 2 via the connected actuator mechanisms 3 and 4. Even in such an arrangement, in the event of a failure of any one of the apparatus components, a partial loss of the apparatus functionality will still arise, because at least the affected sub-system (and possibly also its symmetrical counterpart) must be shut down. Also, due to the increased number of drives 11, and the like, such an apparatus suffers an increased complexity and increased weight in comparison to simpler systems.

SUMMARY OF THE INVENTION

In view of the above, it is an object of the invention to provide an apparatus of the general type discussed above, which makes it possible to achieve a complete or at least partial further operation of the lift enhancing elements in the case of a localized mechanical failure in the apparatus. Another object is to reduce the weight and complexity in comparison to other systems that aim to achieve such redundancy in the operability. The invention further aims to avoid or overcome the disadvantages of the prior art, and to achieve additional advantages, as apparent from the present specification. The attainment of these objects is, however, not a required limitation of the present invention.

The above objects have been achieved according to the invention in an apparatus for driving or actuating lift enhancing elements, e.g. landing flaps arranged along the trailing edges of the wings and/or slats arranged along the leading edges of the wings of an aircraft. The apparatus includes a first centralized drive unit that rotationally drives two first rotational shaft drive lines respectively extending along the wings on two opposite sides of the first centralized drive unit, actuator mechanisms that interconnect the first drive lines with the lift enhancing elements and serve to convert the rotational motion of the respective drive line into a translational motion of the connected lift enhancing element, and a second centralized drive unit that rotationally drives two second shaft drive lines extending on two opposite sides of the second centralized drive unit along the two wings of the aircraft.

According to the invention, the first and second drive units are coupled with one another via the first and second rotational shaft drive lines in such a manner so that the lift enhancing elements are respectively driven by one rotational shaft drive line, and each drive line is mechanically connected respectively at one end thereof with the two drive units. The first rotational shaft drive lines of the first drive unit each include respective separating devices interposed therein respectively between the actuator mechanisms of two adjacent ones of the lift enhancing elements. These separating devices, which may respectively comprise any conventionally known selectively engageable and disengageable coupling device, are closed or engaged in normal operation so as to transmit the rotational motion of the respective drive line therethrough. Thereby, the actuator mechanisms downstream from the respective separating device receive and convert the rotational drive input into the translational motion of the respective connected lift enhancing element.

The above objects have further been achieved according to the invention in an aircraft including a fuselage, left and right wings connected to and extending on opposite sides from the fuselage, lift enhancing elements including at least one of slats movably arranged along leading edges of the wings and flaps movably arranged along trailing edges of the wings, and a drive arrangement for selectively driving or actuating the lift enhancing elements. In this context, the invention provides an improvement of the drive arrangement, comprising a first centralized drive unit preferably arranged in the fuselage, a left first drive line driven by the first drive unit and extending therefrom along the left wing, a right first drive line driven by the first drive unit and extending therefrom along the right wing, a second centralized drive unit preferably arranged in the fuselage, a left second drive line driven by the second drive unit and extending therefrom along the left wing, and a right second drive line driven by the second drive unit and extending therefrom along the right wing.

The first drive lines each include successive rotational shaft segments connected end-to-end in series with one another by respective interposed separating devices, e.g. selectively releasable couplings. The apparatus further includes at least one respective actuator mechanism respectively connected to each of the lift enhancing elements and to a respective associated one of the rotational shaft segments, and adapted to convert the rotational motion of the respective rotational shaft segment to the required actuating motion of the associated lift enhancing element, e.g. a translational extension or retraction of the element or a deflection of the element. Preferably, two of such actuator mechanisms are connected to each lift enhancing element and to the associated rotational shaft segment. Furthermore, a separating device mechanically couples the outboard ends of the left first and second drive lines, and analogously a separating device mechanically couples the outboard ends of the right first and second drive lines.

In an example case including an inboard lift enhancing element and an outboard lift enhancing element on each wing, i.e. on the left side and the right side, each of the first drive lines are separated into three rotational shaft segments connected end-to-end by three separating devices. One rotational shaft segment extends from the first drive unit to the inboard first separating device, the next rotational shaft segment extends from the inboard first separating device to the mid-wing second separating device and serves for driving the inboard lift-enhancing element via the connected actuator mechanisms, and the third rotational shaft segment extends between the mid-wing second separating device and the outboard third separating device and serves to drive the outboard lift enhancing element via the connected actuator mechanisms. The outboard third separating device further mechanically couples the outboard end of the third rotational shaft segment of the first drive line with the outboard end of the second drive line. The arrangement of components on the right wing side is analogous and symmetrical to the arrangement on the left wing side.

According to further preferred embodiments, the inventive apparatus additionally includes a controller embodying a closed-loop control or regulation algorithm for distributing the drive load between both of the drive units in normal operation. In other words, both of the drive units can contribute drive power to the actuation of the several lift enhancing elements, through the interconnection of the first and second drive lines.

In the event of the occurrence of a local mechanical fault or failure of any component of the apparatus, such as a jamming of one of the actuator mechanisms or a break of one of the rotational shaft segments of a drive line, the respective affected component of the apparatus is isolated from the remainder of the apparatus in that the respective two separating devices enclosing the failed component therebetween are opened or decoupled. The inventive apparatus may further comprise at least one brake arrangement for braking or arresting the component or set of components including the failed component, which has or have been isolated between the two decoupled separating devices.

Further according to an alternative preferred embodiment of the invention, two neighboring or adjacent ones of the separating devices enclose not only one but at least two lift enhancing elements with associated actuator mechanisms therebetween.

The inventive apparatus achieves the advantages of maintaining at least a partial operability and functionality of the overall apparatus even in the event of a localized failure of a component. For example, in the event of a failure of one of the drive units or a break of one of the rotational shaft drive lines between one of the inboard separating devices and the associated drive unit, there is no loss of the functionality of the apparatus. In other words, the apparatus continues to provide the full actuating functions or actuating capabilities required for actuating the lift enhancing elements, because the other non-faulty drive unit can drive all of the lift enhancing elements due to the interconnection of the first and second drive lines, even though the faulty drive unit has been disconnected, i.e. isolated. On the other hand, a jamming of one of the actuator mechanisms or a break of a rotational shaft drive line at a location other than that described above leads to only a partial loss of the apparatus functionality. Namely in this case, only the section or segment of the drive line affected by the fault needs to be isolated and arrested, while the remainder of the apparatus remains fully functional. A further advantage of the apparatus according to the invention is a simpler construction and a weight reduction in comparison to other drive systems that aim to achieve a redundant operability.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
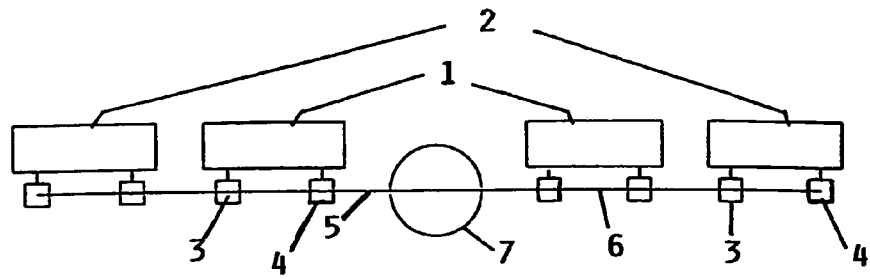
FIG. 1 is a schematic illustration of a simple conventional flap or slat drive system having a single centralized drive unit and a single rotational shaft drive line.
Figure 2:
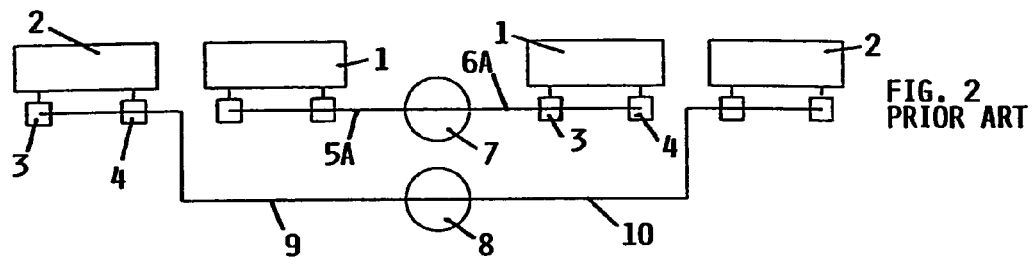
FIG. 2 is a schematic illustration of another conventional flap or slat drive system having two centralized drive units separately driving two rotational shaft drive lines.
Figure 3:
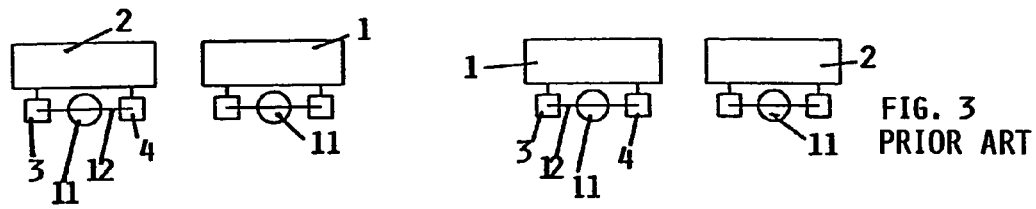
FIG. 3 is a schematic illustration of a further conventional flap or slat drive system having four separate drive units with respectively associated four separate drive lines allocated individually to four separate lift enhancing elements.
Figure 4:
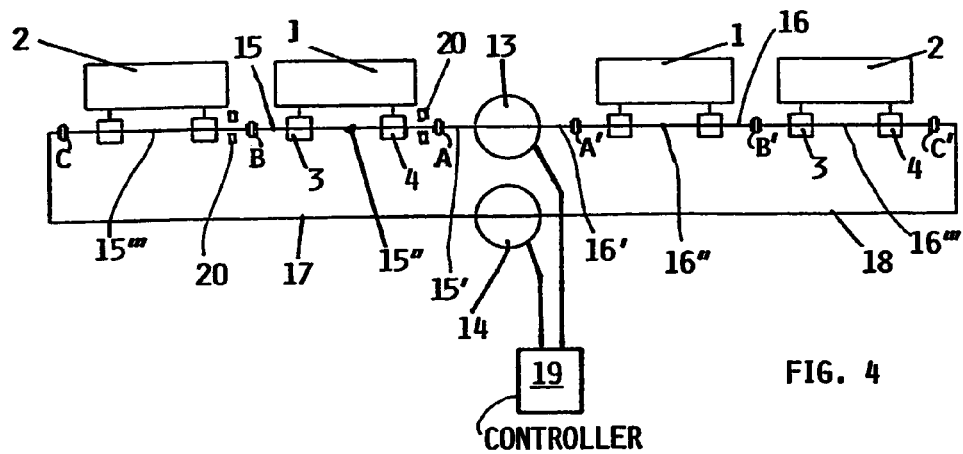
FIG. 4 is a schematic illustration of an example embodiment of a flap or slat drive apparatus according to the invention, including two centralized drive units and two interconnected parallel rotational shaft drive lines.

The conventional systems according to FIGS. 1, 2 and 3 have been described above. The inventive flap or slat drive apparatus according to FIG. 4 is based on some of the same conventional elements as the above described prior art systems. For example, the inventive apparatus according to FIG. 4, in this example embodiment, is for selectively driving or actuating left and right inboard lift enhancing elements 1, and left and right outboard lift enhancing elements 2, which may each be a trailing edge landing flap or a leading edge slat provided on the left and right wings of an aircraft. The final drive or actuation of the lift enhancing elements 1 and 2 is achieved by two actuator mechanisms 3, 4 connected to each one of the lift enhancing elements 1 or 2. The actuator mechanisms 3, 4 can have any conventionally known construction and operation, but basically convert a rotational input drive motion to a translational or deflecting output drive motion that is applied to the respective connected lift enhancing element 1 or 2. The rotational input drive motion is applied to the actuator mechanisms 3, 4 by respective rotational shaft drive lines that are driven by centralized drive units, which may comprise any conventionally known drives for providing a rotational drive power, such as e.g. hydraulic, pneumatic, or electric motors. The inventive apparatus is especially defined by the arrangement and interconnection of the drive line and drive unit components.

More particularly, the inventive apparatus in the example of FIG. 4 includes a first centralized drive unit 13 that rotationally drives left and right first drive lines 15 and 16, as well as a second centralized drive unit 14 that rotationally drives left and right second drive lines 17 and 18. The left first drive line 15 includes three rotational shaft segments 15', 15" and 15'" arranged in series or succession and connected end-to-end respectively by interposed separating devices A, B and C. Thus, the inboard first rotational shaft segment 15' extends from the first drive unit 13 to the first separating device A, the second shaft segment 15" extends from the first separating device A along the inboard lift enhancing element 1 to the mid-span second separating device B, and the outboard third shaft segment 15'" extends from the second separating device B along the outboard lift enhancing element 2 to the outboard third separating device C. The two actuator mechanisms 3 and 4 of the inboard lift enhancing element 1 are connected to the second shaft segment 15', while the two actuator mechanisms of the outboard lift enhancing element 2 are connected to the third shaft segment 15'".

The first drive line 16 on the right side has a similar construction as the first drive line 15 on the left side. Namely, the right first drive line 16 is made up of three successive rotational shaft segments 16', 16" and 16'" respectively connected end-to-end in succession by three separating devices A', B' and C'. The second and third shaft segments 16" and 16'" are respectively connected by two actuator mechanisms 3, 4 to a respective associated lift enhancing element 1 or 2.

In contrast to the first drive lines 15 and 16, the second drive lines 17 and 18 need not be divided or separated into individual shaft segments. Instead, each of the second drive lines 17 and 18 is respectively constructed as a functionally unitary drive shaft, which may be made up of several shaft components or segments, but all of such components or segments are mechanically connected so as to rotate together functionally as a single drive shaft.

The outboard end of each respective second drive line 17 or 18 is respectively connected to the outboard end of the first drive line 15 or 16 via the respective outboard third separating device C or C'. Thereby, in normal operation, with all of the separating devices A, B, C, A', B', C' in the closed or engaged condition, the two drive units 13 and 14 are connected to each other through the outboard ends of their associated drive lines 15, 16, 17 and 18. Also thereby, each of the drive units 13 and 14 contributes drive power to the overall drive line system for distributing the available power to the several actuator mechanisms 3, 4 for actuating the several lift enhancing elements 1, 2. The mechanisms 3, 4 convert the rotational motion of the connected drive line to a translational motion that is applied to the respective connected lift enhancing elements, e.g. landing flaps.

In the above manner, the two drive units 13 and 14 are coupled with one another via the rotational shaft drive lines 15, 16, 17 and 18 such that each rotational shaft drive line 15, 16, 17 and 18 is mechanically connected at one respective end with the two drive units 13 and 14. Furthermore, the separating devices C, B, A, A', B' and C' are respectively arranged between the actuator mechanisms 3 and 4 of two adjacent landing flaps 1 and 2, whereby the separating devices B and B' can form the symmetrical separating point between the first drive unit 13 and the second drive unit 14. In other words, in a normal operating condition with balanced power supply and balanced power requirements, it can be considered that the first drive unit 13 drives the inboard landing flaps 1 via the first drive lines 15 and 16 through the inboard first separating devices A and A', while the second drive unit 14 drives the outboard landing flaps 2 via the second drive lines 17 and 18 (and the shaft segments 15'" and 16'") through the outboard third separating devices C and C'.

In the above described normal operating situation, with all of the separating devices C, B, A, A', B' and C' closed or engaged so that the rotational power of the two drive units 13 and 14 is transmitted via the rotational shaft drive lines 15, 16, 17 and 18, the drive load is distributed between the two drive units 13 and 14 which are suitably controlled by a controller 19 embodying and executing a suitable regulating algorithm. This can be achieved using load sensors, power sensors, and the like.

In a further embodiment, two neighboring or successive ones of the separating devices can enclose at least two lift enhancing elements such as flaps 1 and 2 with their associated actuator mechanisms 3 and 4 therebetween.

In the event of the occurrence of a local mechanical failure in one of the components of the apparatus, the affected component will be isolated from the rest of the apparatus by opening or disengaging the two separating devices, e.g. C and B, or A and A', or B' and C' enclosing the affected faulty component therebetween in the rotational shaft drive lines 15 or 16. Other possible pairings of the separating devices could include B and A, A' and B', or C and C'. In this manner, any faulty component among the entire interconnected system can be isolated from the remainder of the system.

For reasons of aerodynamics, such isolation of a faulty component is preferably carried out symmetrically on both sides, i.e. both wings. In other words, the symmetrical equivalent component of the rotational shaft drive lines 15 or 16 on the opposite wing will similarly be isolated by opening or disengaging the corresponding separating device or devices on the opposite side. As an example, if the separating device A or B or C is opened or disengaged, then the respective opposite separating device A' or B' or C' will also be opened or disengaged.

After opening or disengaging the appropriate separating devices, the portion of the drive line affected by a localized fault will be set to rest, and is preferably positively arrested by means of a brake arrangement 20, for example. The rest of the components, i.e. the rest of the overall system not including the component affected by the fault that has been isolated, remains functional, because the remaining portion or portions of the rotational shaft drive lines 15, 16, 17 and 18 are still connected via the other engaged separating devices to one or both of the functional non-isolated drive units 13 and/or 14.

For example, if one of the drive units fails, then that drive unit is simply isolated by opening the neighboring separating devices, while the other drive unit continues to drive all of the landing flaps. As a further example, if one of the landing flaps becomes jammed, then that landing flap (and preferably likewise its symmetrical counterpart on the opposite wing) is isolated by opening the adjoining separating devices, while the other flaps remain driven by their primarily associated drive unit. This provides a dual redundancy, namely a redundancy of the drive units as well as a redundancy of the drive lines so that complete or at least partial functionality of the landing flaps is ensured in the event of a localized failure of one of the drive units, or of any segment of the drive lines, or a flap or actuator mechanism connected to one drive line segment.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for actuating lift enhancing elements selected from the group consisting of trailing edge flaps and leading edge slats on left and right lifting wings of an aircraft, comprising:
   a first centralized drive unit;
   a left first rotational shaft drive line that is made up of shaft segments and that is mechanically connected to and rotationally drivable by and extends leftwardly from said first centralized drive unit along said left lifting wing;
   a right first rotational shaft drive line that is made up of shaft segments and that is mechanically connected to and rotationally drivable by and extends rightwardly from said first centralized drive unit along said right lifting wing;
   plural actuator mechanisms that are mechanically interconnected between said first rotational shaft drive lines and said lift enhancing elements on said wings, and that are adapted to convert a rotational motion of said first rotational shaft drive lines to a translational motion that is applied by said actuator mechanisms to said lift enhancing elements;
   plural drive line separating devices that are interposed between successive ones of said shaft segments of said first rotational shaft drive lines respectively at locations between respective ones of said actuator mechanisms connected to adjacent ones of said lift enhancing elements on each of said wings, and that are each adapted to selectively couple and separate respective successive ones of said shaft segments of said first rotational shaft drive line on opposite sides of each one of said drive line separating devices, wherein said drive line separating devices couple said respective successive shaft segments of said first rotational shaft drive lines in a normal operating condition;
   a second centralized drive unit;
   a left second rotational shaft drive line that is mechanically connected to and rotationally drivable by and extends leftwardly from said second centralized drive unit along said left lifting wing;
   a right second rotational shaft drive line that is mechanically connected to and rotationally drivable by and extends rightwardly from said second centralized drive unit along said right lifting wing; and
   a right additional drive line separating device that is interposed between and selectively connects and disconnects respective outboard ends of said right first and second rotational shaft drive lines, and a left additional drive line separating device that is interposed between and selectively connects and disconnects respective outboard ends of said left first and second rotational shaft drive lines;
   wherein said first and second centralized drive units are coupled with one another via said first and second rotational shaft drive lines through said additional drive line separating devices so that said drive lines and said additional drive line separating devices form a closed loop drive train.

2. The apparatus according to claim 1, further comprising a controller that comprises a regulation algorithm, and that is connected to said centralized drive units and adapted to control said centralized drive units according to said regulation algorithm so as to distribute a total drive load between said centralized drive units.

3. The apparatus according to claim 1, wherein in a fault operating condition in which a faulty component of said apparatus suffers a local mechanical fault, said drive line separating devices located adjacent to and on opposite sides of said faulty component are adapted to separate said shaft segment of said first rotational shaft drive line therebetween from remaining ones of said shaft segments of said first rotational shaft drive line so as to isolate said faulty component.

4. The apparatus according to claim 3, further comprising a brake arrangement connected to and adapted to selectively arrest at least one of said shaft segment of said first rotational shaft drive line and said faulty component that has been isolated.

5. The apparatus according to claim 1, wherein two adjacent ones of said drive line separating devices are located with at least one said lift enhancing element and at least one of said actuator mechanisms arranged therebetween.

6. In an aircraft including a fuselage, left and right lifting wings extending from said fuselage, lift enhancing elements selected from the group consisting of lift enhancing flaps and slats that are movably arranged on trailing edges or leading edges of said wings, and a drive system connected to and adapted to selectively actuate said lift enhancing elements, an improvement in said drive system comprising:

a first centralized drive unit;

a left first drive line that is mechanically connected to and rotationally drivable by and extends leftwardly from said first centralized drive unit along said left wing, and that includes plural left drive shaft segments arranged successively end-to-end;

a right first drive line that is mechanically connected to and rotationally drivable by and extends rightwardly from said first centralized drive unit along said right wing, and that includes plural right drive shaft segments arranged successively end-to-end;

plural actuator mechanisms, wherein at least a respective one of said actuator mechanisms is mechanically interconnected between each one of said lift enhancing elements and a respective one of said drive shaft segments, and wherein said actuator mechanisms are adapted to convert and transmit a rotational motion of said drive shaft segments to an actuating motion of said lift enhancing elements;

plural drive line separating devices that are respectively interposed between and selectively connect and disconnect respective adjacent ends of said drive shaft segments;

a second centralized drive unit;

a left second drive line that is mechanically connected to and rotationally drivable by and extends leftwardly from said second centralized drive unit along said left wing;

a right second drive line that is mechanically connected to and rotationally drivable by and extends rightwardly from said second centralized drive unit along said right wing; and a right additional drive line separating device that is interposed between and selectively connects and disconnects respective outboard ends of said right first and second drive lines, and a left additional drive line separating device that is interposed between and selectively connects and disconnects respective outboard ends of said left first and second drive lines.

7. The improvement in the drive system in the aircraft according to claim 6, wherein each one of said lift enhancing elements is respectively connected by at least one of said actuator mechanisms to a respective one of said drive shaft segments between two successive ones of said drive line separating devices.

8. The improvement in the drive system in the aircraft according to claim 6, wherein said first and second drive lines are connected with one another only at said outboard ends thereof and only via said additional drive line separating devices.

9. The improvement in the drive system in the aircraft according to claim 6, wherein said first and second centralized drive units are arranged in said fuselage, inboard ends of said first drive lines are mechanically connected to said first centralized drive unit, and inboard ends of said second drive lines are mechanically connected to said second centralized drive unit.

* * * * *